United States Patent [19]

Berlin

[11] Patent Number: 4,892,346
[45] Date of Patent: Jan. 9, 1990

[54] DROP-IN UTILITY ENCLOSURE APPARATUS

[76] Inventor: Joseph P. Berlin, 198 Plank Rd, Clifton Park, N.Y. 12065

[21] Appl. No.: 310,913

[22] Filed: Feb. 16, 1989

[51] Int. Cl.$^4$ .............................................. B60R 11/00
[52] U.S. Cl. ..................................... 296/37.6; 296/26; 224/42.42
[58] Field of Search .................. 296/37.6, 167, 10, 26; 224/42.42 R

[56] References Cited

U.S. PATENT DOCUMENTS

| | | | |
|---|---|---|---|
| 3,536,352 | 10/1970 | Beckley | 296/167 |
| 3,840,263 | 10/1974 | Bowden | 296/10 |
| 3,854,621 | 12/1974 | Parry | 296/37.6 |
| 4,063,762 | 12/1977 | Williams | 296/167 |
| 4,288,011 | 9/1981 | Grossman | 224/42.42 |
| 4,397,497 | 8/1983 | Alonzo, Jr. et al. | 296/26 |
| 4,580,827 | 4/1986 | Feagan | 296/37.6 |
| 4,635,992 | 1/1987 | Hamilton et al. | 296/37.6 |
| 4,659,136 | 4/1987 | Martin et al. | 296/100 |
| 4,728,017 | 3/1988 | Mullican | 224/42.42 |
| 4,752,095 | 6/1988 | Brady | 296/37.6 |

*Primary Examiner*—Robert R. Song
*Attorney, Agent, or Firm*—Leon Gilden

[57] ABSTRACT

A drop-in utility enclosure apparatus is set forth for securement within a fowardmost portion of a truck bed wherein the apparatus utilizes a lower unit integrally formed to an upper unit. The lower unit includes a plurality of lockable first and second lids to secure the lower unit for storage of valuable portions therein, such as tools and the like. Each lid includes a plurality of brackets lockable in an upper first position and pivotally downward to a second position to overlie the lower unit in a secure relationship.

12 Claims, 4 Drawing Sheets

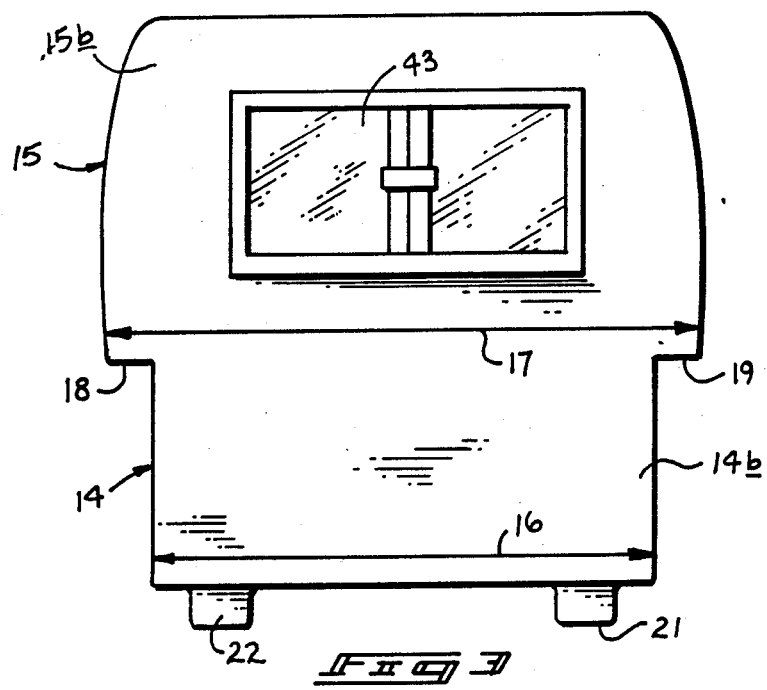
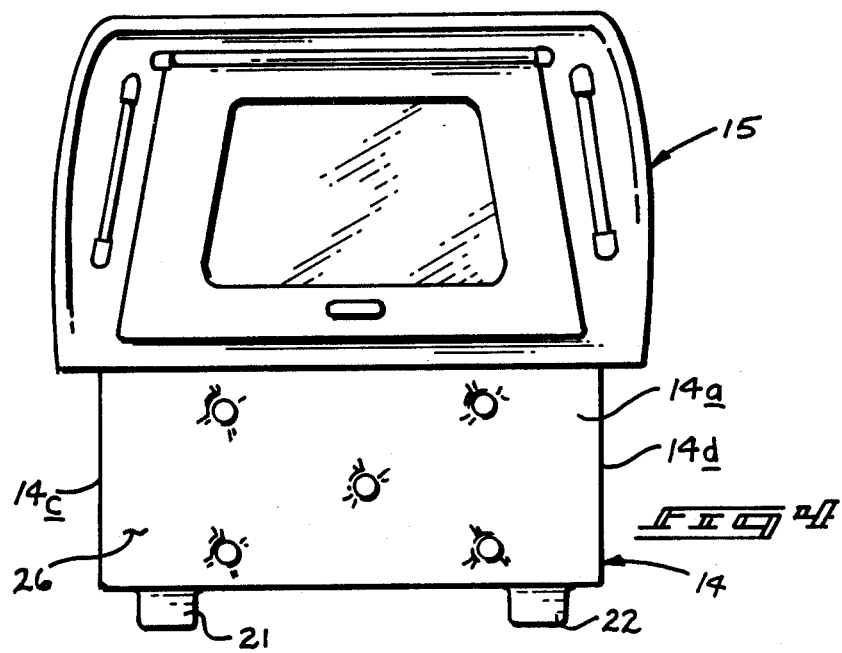

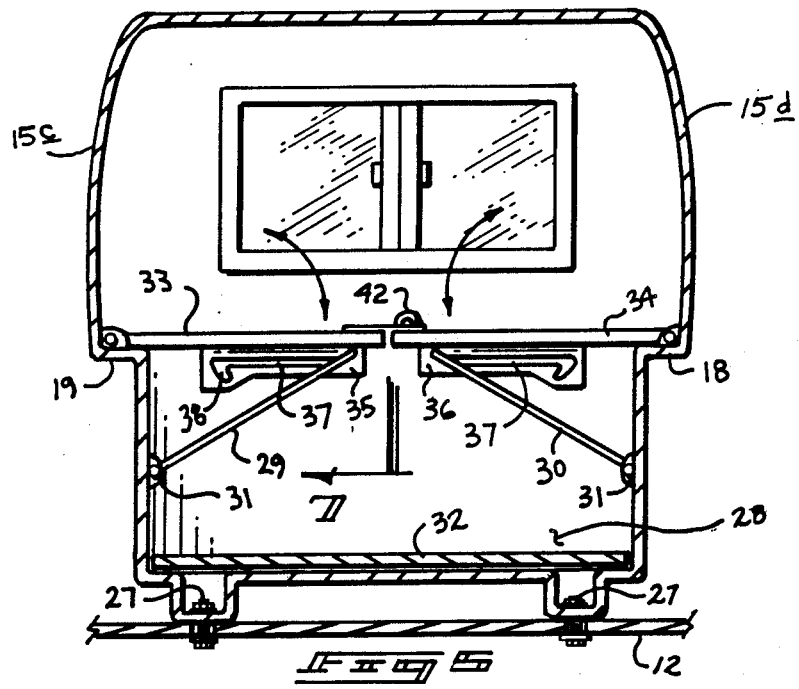
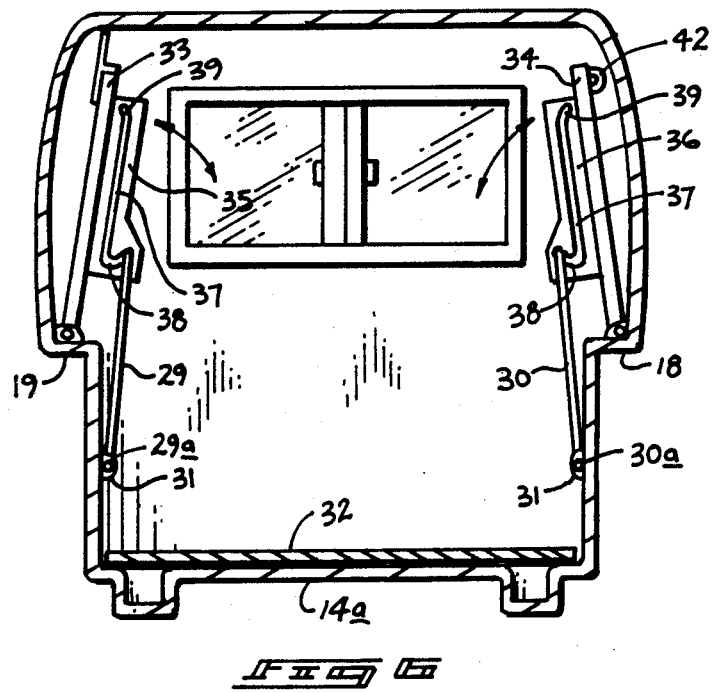

DROP-IN UTILITY ENCLOSURE APPARATUS

BACKGROUND OF THE INVENTION

1. Field of the Invention

The field of invention relates to portable drop-in canopies, and more particularly pertains to a new and improved drop-in utility enclosure apparatus wherein the same is securable within a forwardmost portion of a truck bed interior and compactly and effectively provides enclosed and lockable storage interiorly thereof.

2. Description of the Prior Art

The use of drop-in enclosures is known in the prior art for use with truck beds, but the prior art has heretofore utilized cumbersome and elaborate organizations failing to provide the compact and efficient unit set forth by the instant invention.

For example, U.S. Pat. No. 8,586,852 to Beckley sets forth a multi-part camper shell overlying the length of a truck bed wherein the shell utilizes a relatively complex association of various classes and the like for securement of the shell interiorly of the truck bed.

U.S. Pat. No. 8,840,263 to Bowden sets forth a portable seat securable within a forwardmost portion of a truck body and utilizes adjustable screw members to maintain the seat in position relative to the truck body wherein the Bowden patent fails to provide an enclosable structure with various compartments, as set forth by the instant invention.

U.S Pat. No. 4,068,762 to Williams sets forth a canopy overlying the length of a pickup truck bed incorporating a rigid frame securable to an uppermost flange of the truck body and is of interest relative to the citation of the prior art setting forth the heretofore utilized relationship of inserted shells relative a truck bed.

U.S. Pat. No. 4,397,497 to Alonzo, et al., sets forth an expandable camper unit positionable within a forwardmost portion of the truck body bed telescopingly expandable along the entire length of the bed for subsequent use therein, but fails to provide the compact and effective enclosure arrangement as set forth by the instant invention.

U.S. Pat. No. 4,659,136 to Martin sets forth a telescopingly collapsible enclosure in the same vein of the Alonzo patent to telescopingly position a shell overlying a truck bed.

As such, it may be appreciated that there is a continuing need for a new and improved drop-in utility enclosure apparatus wherein the same addresses both the problems of compactness and ease of use, and in this respect, the present invention substantially fulfills this need.

SUMMARY OF THE INVENTION

In view of the foregoing disadvantages inherent in the known types of module inserts for truck beds now present in the prior art, the present invention provides a drop-in utility enclosure apparatus wherein the same includes a modular construction-type housing including a readily securable and positionable enclosure for convenient utilization by a user thereof. As such, the general purpose of the present invention, which will be described subsequently in greater detail, is to provide a new and improved drop-in utility enclosure apparatus which has all the advantages of the prior art drop-in type housings for use with truck bodies and none of the disadvantages.

To attain this, the present invention comprises a self-contained drop-in module securable to a truck body including a lower unit and integrally formed upper unit wherein the upper unit is formed with outwardly directed contact surfaces for weight dispersal and securement to the truck body. Interiorly, a rearwardly positioned pivotally mounted door provides access interiorly of the module to a compartment including a lower compartment securable by means of downwardly interfolding door &o partition the compartment as desired.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved drop-in utility enclosure apparatus which has all the advantages of the prior art drop-in utility enclosure apparatus and none of the disadvantages.

It is another object of the present invention to provide a new and improved drop-in utility enclosure apparatus which may be easily and efficiently manufactured and marketed.

It is a further object of the present invention to provide a new and improved drop-in utility enclosure apparatus which is of a durable and reliable construction.

An even further object of the present invention is to provide a new and improved drop-in utility enclosure apparatus which is susceptible of a low cost of manufacture with regard to both materials and labor, and which accordingly is then susceptible of low prices of sale to the consuming public, thereby making such drop-in utility enclosure apparatus economically available to the buying public.

Still yet another object of the present invention is to provide a new and improved drop-in utility enclosure apparatus which provides in the apparatuses and methods of the prior art some of the advantages thereof, While simultaneously overcoming some of the disadvantages normally associated therewith.

Still another object of the present invention is to provide a new and improved drop-in utility enclosure apparatus wherein the same is formed as a weight distribution module provided with an interiorly accessible compartment selectively divisible for utilization of the apparatus as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic front view taken in elevation of the instant invention.

FIG. 4 is an orthographic rear view taken in elevation of the instant invention.

FIG. 5 is an orthographic view taken along the lines 5—5 of FIG. 2 in the direction indicated by the arrows with the interiorly mounted lids in a lowered position.

FIG. 6 is an isometric illustration of the view of FIG. 5 with the lids in a raised position.

DESCRIPTION OF THE PREFERRED EMBODIMENT

Figure 1:
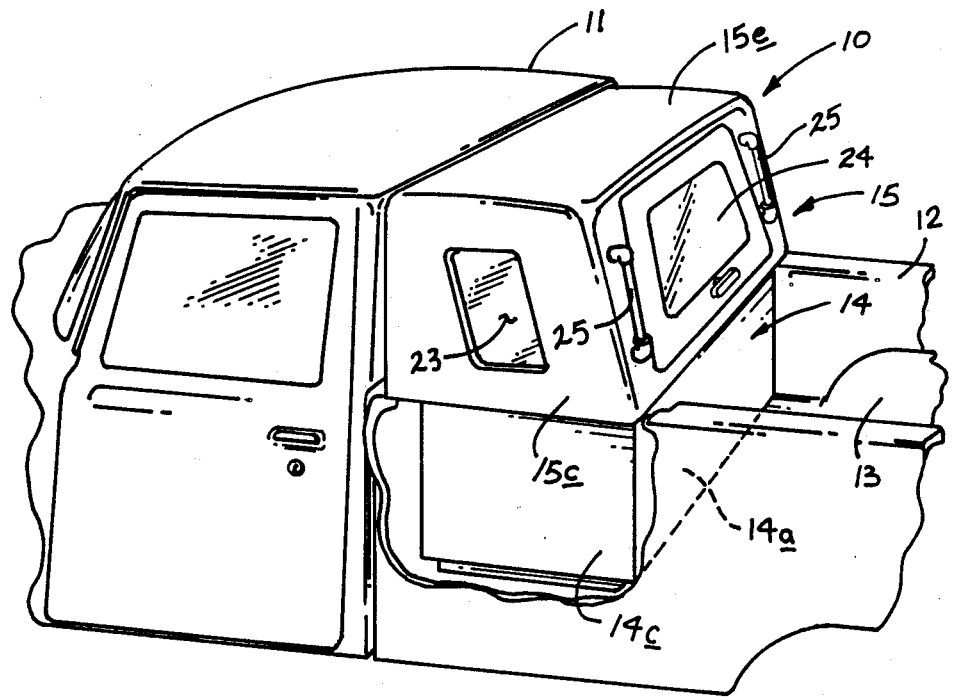
FIG. 1 is an isometric illustration of the apparatus secured in combination with a truck body.
Figure 2:
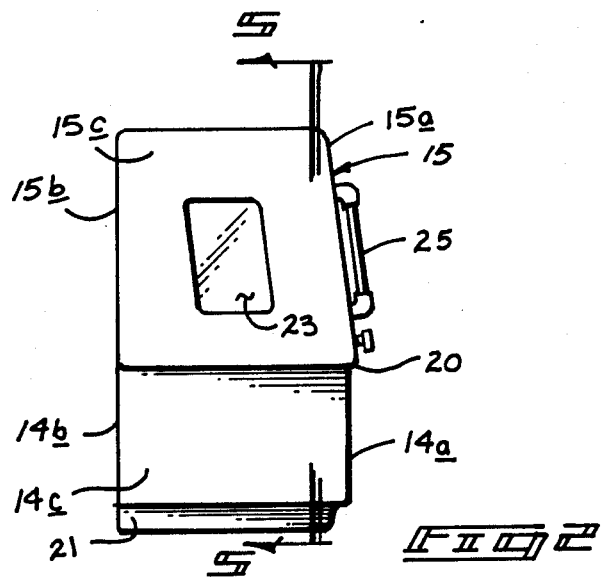
FIG. 2 is an orthographic side view taken in elevation of the instant invention.
Figure 7:
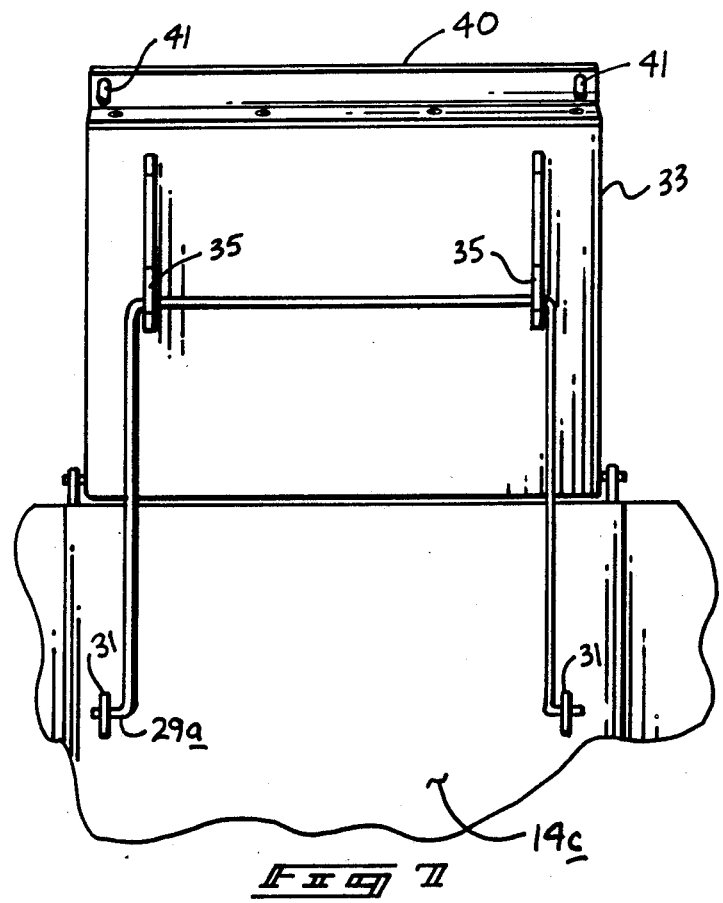
FIG. 7 is an orthographic sectional view of FIG. 5 in the direction indicated by arrow 7.
Figure 8:
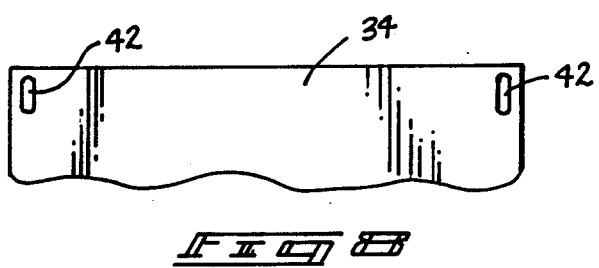
FIG. 8 is a partial sectional view of the companion lid utilized in combination with that as illustrated in FIG. 7.

With reference now to the drawings, and in particular to FIGS. 1 to 8 thereof, a new and improved drop-in utility enclosure apparatus embodying the principles and concepts of the present invention and generally designated by the reference numeral 10 will be described.

More specifically, the drop-in utility enclosure apparatus 10 of the instant invention essentially comprises a self-contained module for securement in association with the truck 11 and more specifically with an interior forward surface portion of the truck bed 12 forwardly of the wheel-well covers 13. The module includes a lower unit 14 and an upwardly extending overlying upper unit 15. The lower unit includes a rear face 14a, a forward face 14b, and respective first and second sides 14c and 14d, as well as an associated bottom face 14e. The upper unit 15 includes a downwardly sloping rear face 15a with a forward face 15b aligned in the same plane of the forward face 14b of the lower unit and wherein the upper unit further includes first and second sides 15c and 15d and a top face 15e.

The lower unit 14 is of a lower length 16 substantially equal to the spacing defined between the sides of the truck bed with the upper unit 15 defined by an upper length 17 substantially greater than that of the lower length 16 to overlap the sides of the truck bed to define a first contact surface 18 and a second contact surface 19 extending outwardly and orthogonally relative to the first and second sides 14c and 14d of the lower unit to support and align the unit relative to the truck bed 12. The lower unit is of a height substantially equal to that of the truck bed 12 to position first and second leg wells 21 and 22 into contact with the floor of the truck bed 12, as illustrated in FIG. 5 for example. The upper unit 15 is provided further with an overlap surface 20 defined by the rear face 15a of the upper unit extending outwardly over the rear face 14a of the lower unit to enhance the volumetric capacity of the upper unit 15. The respective first and second sides of the upper unit are formed with transparent windows 23 (one of which is shown) with a pivotally mounted rearward door 24 formed with a transparent through-extending window with grab handles 25 positioned parallel to the side edges of the rearward door 24 to enable an individual to grasp the handles to maintain the user's stability during utilization of the apparatus. Optionally, padding 26 is secured onto the outer rear face 14a of the lower unit to provide protection to the unit against articles contained within the remaining cargo area of the truck bed 12.

A plurality of fasteners 27 extend orthogonally downwardly through the first and second leg wells 21 and 22 to secure the floor of the truck bed 12, as illustrated in FIG. 5 for example.

The lower chamber 28 defining the interior volume of the lower unit 14 is utilized as a security chamber or alternatively enables articles to be maintained within the lower chamber 28 while providing an upper surface formed by the top surfaces of the first and second lids 33 and 34 respectively. The respective first and second lids 33 and 34 are mounted to first and second "U" shaped positioning loops 29 and 30 pivotally mounted to plural pairs of brackets 31 formed with through-extending apertures pivotally accepting the lower terminal feet 29a and 30a of the respective first and second "U" shaped positioning loops 29 and 30. Further, a removable floor 32 of substantially the same surface area of the lower surface of the lower unit 14 is removably mounted within the lowermost portion of the lower unit to provide a planar surface.

Each of the respective first and second lids 33 and 34 are provided with respective firs& and second pairs of parallel spaced lid brackets 35 and 36 each formed with "S" shaped guide slots 87 therethrough. Each "S" shaped guide slot 37 is formed with a lower locking slot 38 forwardly directed of the bracket 37 with an upper positioning slot 39 forwardly directed in the same orientation as the lower locking slot 38.

The forwardmost edge of the first lid 33 has integrally secured thereto a "T" shaped positioning flange 40 with the flange 40 formed with spaced locking slots 41 positioned adjacent each edge of the flange 40 to receive therethrough "U" shaped locking loops 42 formed to the upper outermost edge of the second lid 34.

Further, a forward sliding window 43 is alignable with a conventional rear window of the truck 11 to enable access to the interior of the apparatus 10 through the cab portion of the truck 11.

As to the manner of usage and operation of the instant invention, therefore, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A drop-in utility enclosure apparatus removably mountable into the forwardmost portion of a flat truck body including vertical walls extending upwardly from the truck body wherein said apparatus comprises,
   a lower unit defined by a lower rear face, a lower forward face, a lower first side, a lower second side, and a lower bottom face, and
   an upper unit integrally formed to and extending upwardly of said lower unit defined by an upper rear face, an upper top face, an upper first side, an upper second side, and an upper forward face aligned with said lower forward face and wherein said upper first and second sides extend outwardly of said lower first and second sides to define first and second surfaces to overlie the walls of the truck body, and
   wherein said lower rear and forward faces are of a length substantially equal to that of the interior width of the truck bed and of a height substantially equal to that of the walls of the truck bed, and the length of the forward and rear faces of the upper unit are defined by the lengths greater than that of the lower forward and rear faces to overlie the walls of the truck bed, and
   wherein said upper rear face includes a pivotally mounted door enabling access interiorly of the upper and lower units, and
   wherein first and second lids are pivotally mounted overlying the first and second surfaces interiorly thereof in the upper unit to completely overlie the lower unit interiorly thereof when the first and second lids are in a lowered position.

2. A drop-in utility enclosure apparatus as set forth in claim 1 wherein said first lid and said second lid each include a plurality of spaced brackets secured to lowermost surfaces of the first and second lids and wherein the brackets are parallel to one another and are formed with guide slots therein.

3. A drop-in utility enclosure apparatus as set forth in claim 2 wherein guide slots are of a generally "S" shaped configuration formed with a central slot and a lower locking slot extending forwardly of the bracket& and an upper positioning slot extending also forwardly of the central slot.

4. A drop-in utility enclosure apparatus as set forth in claim 3 wherein each of the "S" shaped guide slots slidingly accept therethrough a "U" shaped positioning loop.

5. A drop-in utility enclosure apparatus as set forth in claim 4 wherein each of said "U" shaped positioning loops are formed with lower terminal feet wherein said feet are pivotally mounted within brackets integrally secured to interior surfaces of the side walls of the lower unit and wherein said "U" shaped brackets align the lids in the lower position and further maintain the lids in a locked orientation in an upper position when said "U" shaped slots are in the lower locking slots of the respective pairs of brackets.

6. A drop-in utility enclosure apparatus as set forth in claim 5 wherein the first lid includes a "T" shaped positioning flange secured thereto to enhance the alignment of the first and second lids relative to one another.

7. A drop-in utility enclosure apparatus as set forth in claim 6 wherein the "T" shaped flange includes a plurality of locking slots extending therethrough adjacent terminal ends of the "T" shaped flange.

8. A drop-in utility enclosure apparatus as set forth in claim 7 wherein the second lid includes at its forwardmost end thereof and upper surface thereof a plurality of "U" shaped locking loops to be received within the respective locking slots of the "T" shaped flange.

9. A drop-in utility enclosure apparatus as set forth in claim 8 wherein the upper unit includes a window formed in each of the first and second sides thereof.

10. A drop-in utility enclosure apparatus as set forth in claim 9 wherein the upper forward face includes a sliding window formed therethrough in substantial alignment with a rear window of the cap portion of the truck when the upper and lower units are secured to the truck body.

11. A drop-in utility enclosure apparatus as set forth in claim 12 wherein the lower bottom face of the lower unit includes a plurality of spaced leg wells and wherein each leg well extends below the lower face and includes at least one fastener to secure the leg wells to the truck bed.

12. A drop-in utility enclosure apparatus as set forth in claim 11 wherein a removable floor is removably mounted to overlie the leg wells and dimensioned to substantially equal the interior bottom surface of the lower unit to present a lower planar floor when the removable floor is positioned within the lower unit.

* * * * *